United States Patent [19]

Yeh

[11] Patent Number: 4,500,178

[45] Date of Patent: Feb. 19, 1985

[54] ISO-INDEX BIREFRINGENT FILTERS

[75] Inventor: Pochi A. Yeh, Thousand Oaks, Calif.

[73] Assignee: Rockwell International Corporation, El Segundo, Calif.

[21] Appl. No.: 310,562

[22] Filed: Oct. 13, 1981

[51] Int. Cl.³ .............................................. G02B 5/28
[52] U.S. Cl. .................................... 350/404; 350/400
[58] Field of Search ............................... 350/400, 404

[56] References Cited

U.S. PATENT DOCUMENTS 4,229,073 10/1980 Lotspeich .
4,247,166 1/1981 Yeh .

OTHER PUBLICATIONS

Yeh, P., "Zero Crossing Birefringent Filters", Optics Communications, 10-1980, pp. 15-19.
Title et al., "Tunable Birefringent Filters", Optical Engineering, 11/12 1981, pp. 815-823.
Evans, J. W., "The Birefringent Filter", Jr. Opt. Soc. Am., 3-1949, pp. 229-240.
Chandrasekharan, et al., Anomalous Dispersion of Birefringence of Sapphire and Magnesium Fluoride in the Vacuum Ultraviolet, 8, Appl. Optics, 671, (1969).
Evans, Solc Birefringent Filter, 48, J. Optocal. Soc. Am., 142, (1958).
Henry, Coupling of Electromagnetic Waves in CdS, 143, Phys. Rev., 627, (1966).
Laurenti, et al., Graded Composition Semiconductors as Tunable Narrow-Band Optical Filters, 48, J. Appl. Phys., 203, (1977).
Laurenti, et al., Optical Filters Using Coupled Light Waves in Mixed Crystals, 28, Appl. Phys. Lett., 212, (1976).
Lotspeich, Iso-Index Coupled-Wave Electrooptic Filter, QE-15, IEEE J. Quant. Elect., 904, (1979).
Pinnow, et al., An Electro-Optic Tunable Filter, 34, Appl. Phys. Lett., 391, (1979).

*Primary Examiner*—William H. Punter
*Attorney, Agent, or Firm*—H. Fredrick Hamann; Craig O. Malin; John J. Deinken

[57] ABSTRACT

Disclosed is an optical filter for selectively transmitting light in a passband at the wavelength λ, including an initial polarizer with a polarization direction perpendicular to a beam path and a final polarizer spaced from the initial polarizer along the path and having the same polarization direction. A birefringent element is positioned between the polarizers with an optic axis perpendicular to the path and rotated with respect to the polarization direction, the element having a birefringence which is zero at the wavelength λ. Lyot-Ohman and Solc embodiments of the filter are also described.

10 Claims, 8 Drawing Figures

ISO-INDEX BIREFRINGENT FILTERS

BACKGROUND OF THE INVENTION

This invention relates to optical filters and, in particular, to optical filters utilizing birefringent materials.

In a number of applications of optical technology, it is necessary to isolate a particular wavelength or band of wavelengths from incident light containing a broad band of wavelengths. In the field of infrared detection, for example, a typical target object, such as an airborne vehicle, can be identified because it will emit a characteristic infrared radiation spectrum containing features which are unique to that type of vehicle, such as one or more peak amplitudes at particular wavelengths in the spectrum. Consequently, it is essential to provide a detection apparatus with the capability of filtering incident light to obtain a signal with a narrow bandwidth centered about one or more specific wavelengths and with a high rejection for the off-band portions of the received light. Another typical application where such a filtering device is needed is in optical communications systems, where a carrier optical beam may be multiplexed with a plurality of different signals, each modulating a different frequency within the beam spectrum. A narrow band filter is utilized to separate information encoded on a particular wavelength from the remainder of the carrier beam.

A number of optical systems of current interest require a filter with an extremely narrow bandwidth and a wide angular field. In the study of solar physics, for example, the distribution of hydrogen is measured by photographing the solar corona in the light of the $H_\alpha$ ($\lambda = 6563$ Å) spectral line. Since a large amount of light is present in neighboring wavelengths, a filter which passes a very narrow bandwidth (approximately 1 Å) is required to attain reasonable discrimination. Another application for such filters is in those laser communications systems where the signal information must be transmitted through a random medium, such as the earth's atmosphere or sea water. The signal is carried by a scattered component of the laser radiation, which will appear to come from a wide field of view of up to several steradians. Optical communications under such severe circumstances demand a filter with not only an exceptionally narrow bandwidth, to reject unwanted background light and thereby increase the signal-to-noise ratio, but also a large angular aperture to facilitate the receipt of as much of the signal energy as is possible. Birefringent filters offer the potential to satisfy such demanding performance requirements.

The birefringent filters which are known in the prior art are composed of birefringent crystal plates (wave plates) placed between pairs of polarizers. The two basic versions of such filters which have generally been utilized are the Lyot-Ohman and Solc filters, which are designed to operate through the interference of polarized light. To achieve the necessary polarization interference, these filter designs must introduce a phase retardation between the respective components of the light polarized parallel to the fast and slow axes of the crystal when radiation passes through it. Since the phase retardation introduced by a wave plate is directly proportional to the birefringence of the crystal material from which the plate is fabricated, it has been thought desirable to utilize crystals with a large value of birefringence (i.e., with $|n_e - n_o|$ large) in the construction of such filters. The materials which have most commonly been used in accordance with this approach are quartz, calcite, and ADP.

Unfortunately, however, filters designed with a maximum amount of birefringence (to achieve a narrow bandwidth) tend to exhibit a field of view which is too limited for many applications, due to the substantial change in the effective thickness of the wave plate which will occur in such a filter for light entering at angles of incidence away from the normal direction. This shortcoming has been ameliorated to some extent by adding wide field optical elements to such filters, but the narrow bandwidth (sub-Angstrom) birefringent filters known in the art have nevertheless provided only a moderate field of view and, in addition, have required inordinately thick crystal plates to achieve a sufficiently narrow bandwidth.

One possible solution to this problem is a unique type of new optical filter which is based on the accidental zero crossing of birefringence that occurs near the absorption band edge in certain uniaxial crystals. This filter was demonstrated in 1966 by C. H. Henry (see 143 Phys. Rev. 627 (1977)). The coupling of the ordinary and extraordinary electromagnetic waves in CdS at the crossing wavelength may be induced by an external magnetic field, an external electric field, or an applied stress. Since this coupling takes place only at the crossing wavelength, the effect can be used to produce a narrow bandpass filter when used with a pair of crossed polarizers. All such filter designs, however, require a perturbation such as stress, or a magnetic or electric field, to activate the effect. It would be desirable to provide a filter which exhibits a wide field of view and is capable of passing an extremely narrow bandwidth without the need for such an applied perturbation.

SUMMARY OF THE INVENTION

It is a general objective of this invention to provide a new and improved optical filter.

This optical filter, which selectively transmits light in a passband at the wavelength $\lambda$, includes an initial polarizer with a polarization direction perpendicular to a beam path and a final polarizer spaced from the initial polarizer along the path and having the same polarization direction. A birefringent element is positioned between the polarizers with an optic axis perpendicular to the path and rotated with respect to the polarization direction, the element having a birefringence which is zero at the wavelength $\lambda$.

In a first more particular embodiment, the filter includes a plurality of birefringent elements spaced along the beam path, each with an optic axis perpendicular to the path and each being twice as thick as the preceding element, the elements having a birefringence which is zero at the wavelength $\lambda$. An initial polarizer precedes the elements along the path and a final polarizer follows the elements along the path, with an intermediate polarizer located between each two adjacent elements. All of the polarizers are oriented with a common polarization direction which is perpendicular to the path and is rotated about the path by 45° with respect to the optic axis.

In a second more particular embodiment, an initial polarizer is positioned with its polarization direction perpendicular to the beam path and a final polarizer is spaced from the initial polarizer along the beam path and is oriented to have the same polarization direction. A plurality of N birefringent elements of equal thickness is arranged along the beam path between the polarizers, each with its optic axis perpendicular to the path such that the optic axis of the nth element (n=1, 2 ... N) is rotated with respect to the polarization direction by $\rho(2n-1)$ where $\rho=45°/N$, the elements having a birefringence which is zero at the wavelength $\lambda$.

Uniaxial crystals, such as CdS, are contemplated for use as the birefringent elements in these filters.

These examples summarize some of the more important features of this invention. There are, of course, additional details involved in the invention, which are further described below and which are included within the subject matter of the appended claims.

BRIEF DESCRIPTION OF THE DRAWINGS

Additional objectives, features, and advantages of the present invention will be evident from the description below of the preferred embodiments and the accompanying drawings, wherein the same numerals are used to refer to like elements through all the figures. In the drawings.

DESCRIPTION OF THE PREFERRED EMBODIMENTS

Figure 1:
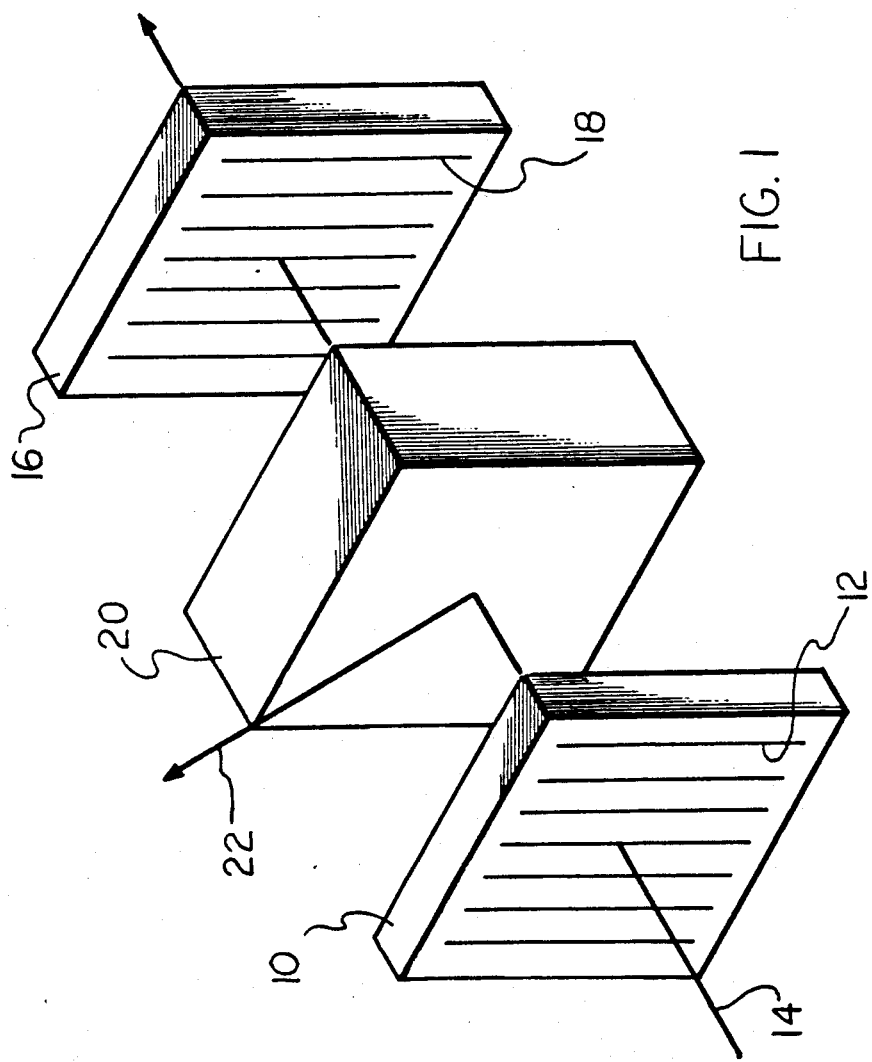
FIG. 1 is an exploded perspective view of optical filter constructed in accordance with the present invention.

FIG. 1 is an exploded view, in perspective, illustrating an optical filter constructed in accordance with the present invention for selectively transmitting light in a passband at the wavelength $\lambda$. This filter includes an initial polarizer 10 with a polarization direction, as indicated by the lines 12, which is perpendicular to a representative beam path 14 which passes through the center of the polarizer. A final polarizer 16 is spaced from the initial polarizer along the path 14 and oriented with a polarization direction, as indicated by the lines 18, which is parallel to that of the initial polarizer 10.

Figure 3:
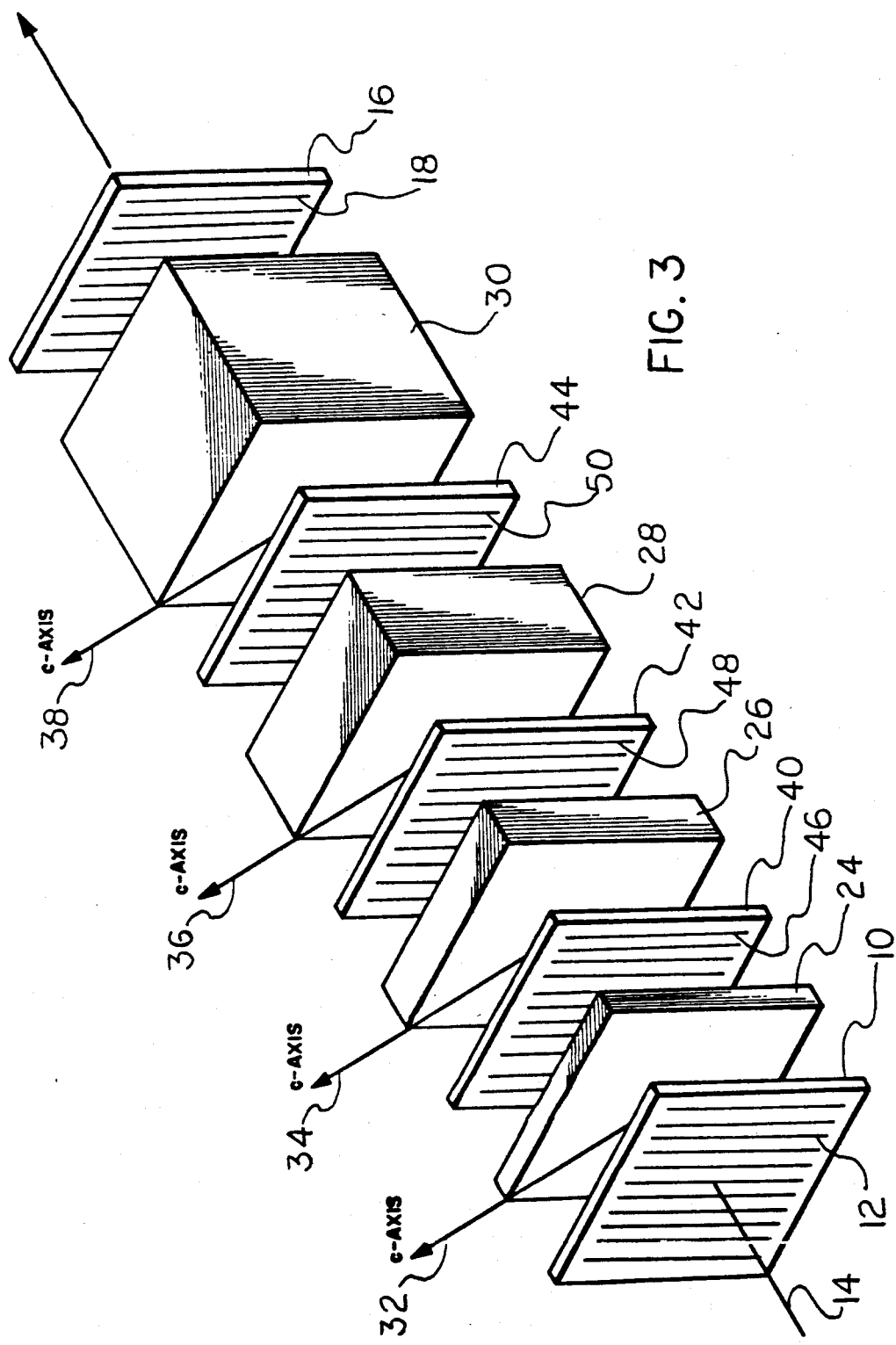
FIG. 3 is an exploded perspective view of a Lyot-Ohman embodiment of the present invention.
Figure 5:
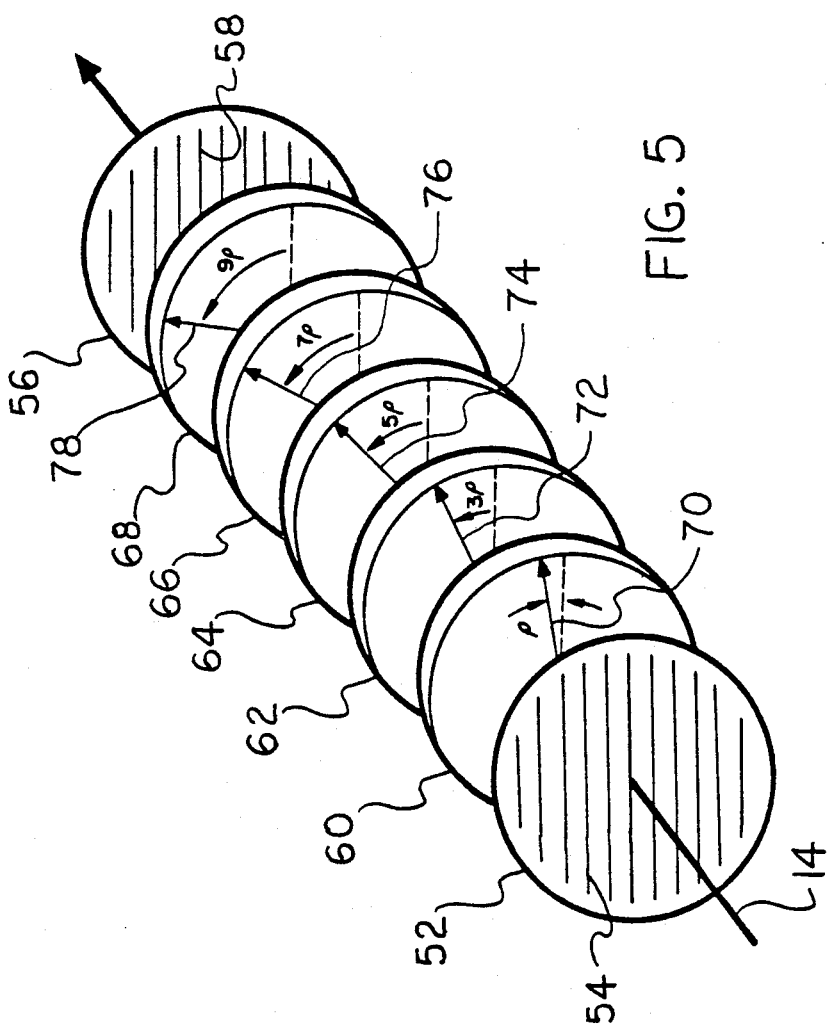
FIG. 5 is an exploded perspective view of a Solc embodiment of the present invention.

A birefringent element 20 is positioned between the polarizers 10 and 16 such that its optic axis, which is represented by the line 22, is both perpendicular to the beam path 14 and rotated 45° about the beam path with respect to the polarization direction of the polarizers 10 and 16. It should be noted that this angle between the polarization direction and the optic axis is not critical—small variations from the optimum 45° can be tolerated since no substantial degradation in the filter's performance will occur. The material for the element 20 is chosen to exhibit a birefringence which is zero at the desired passband wavelength $\lambda$. Those skilled in the art will appreciate that the thicknesses of the birefringent elements and the polarizers depicted in this drawing and in FIGS. 3 and 5 are exaggerated in order to effectively illustrate the structure of these filters.

Figure 2:
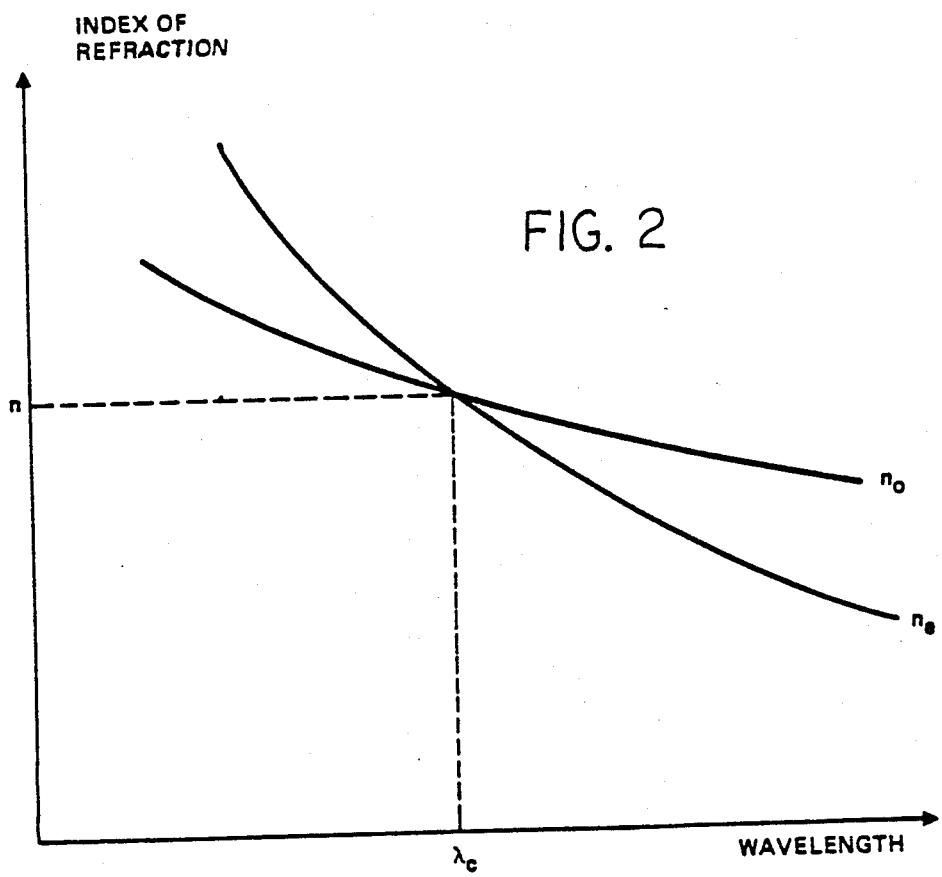
FIG. 2 is a plot of the ordinary and extraordinary indices of refraction for a birefringent material having a zero crossing of its birefringence.

The operation of this new type of filter is based upon the zero crossing of birefringence which occurs, for example, in certain uniaxial crystals such as CdS, AgGaS$_2$, Zn$_x$Cd$_{1-x}$S, and CdS$_x$Se$_{1-x}$. Typical dispersion curves for such a material are illustrated in FIG. 2, which is a graphical plot of the ordinary and extraordinary indices of refraction for a uniaxial crystal as a function of wavelength, showing that the material becomes isotropic at a wavelength $\lambda_c$ for which $n_o = n_e$. In the spectral regime around the isotropic point $\lambda_c$, the birefringence can be approximately given as:

$$n_e - n_o = \alpha(\lambda31\ \lambda_c) + \ldots \quad (1)$$

where $\alpha$ is the rate of dispersion of the birefringence at the zero crossing wavelength $\lambda_c$, i.e., $$60 = [d/d\lambda](n_e - n_o). \quad (2)$$

The phase retardation of a wave plate made of such a crystal is zero at the crossing wavelength, so that the plate is a zero wave plate for this wavelength regardless of the angle of incidence. Consequently, when such a wave plate is placed between a pair of parallel polarizers, the structure performs like a typical stage of a Lyot-Ohman filter. The transmission of such a structure for polarized light is:

$$T = \cos^2 \Gamma/2 \quad (3)$$

where $\Gamma$ is the phase retardation of the plate and is given by $$\Gamma = (k_e - k_o)\ d = [2\pi/\lambda](n_e - n_o)\ d, \quad (4)$$

$k_e$ and $k_o$ being the wave numbers of the extraordinary and ordinary waves in the crystal, respectively. $n_e$ and $n_o$ are the refractive indices of the crystal and d is the thickness of the plate. It is also assumed that the c-axis (the optic axis) of the plate is parallel to the surfaces and is rotated 45° from the transmission axis of the polarizer.

With this arrangement, the maximum transmission will always occur at $\lambda = \lambda_c$ because $n_e - n_o$ vanishes at that wavelength and the phase retardation $\Gamma$ becomes zero. The transmission characteristics at other wavelengths are governed by the variation of $\Gamma$ with respect to the wavelength. In the spectral regime around $\lambda_c$ the variation of $\Gamma$ with respect to $\lambda$ is dominated by the dispersion of $(n_e - n_o)$ provided $\alpha$ is large enough, while the factor $1/\lambda$ plays only a very minor role. Thus, relatively thin plate of a zero crossing birefringent crystal will transmit a very narrow bandwidth. From Equations (1), (3), and (4), the full width at half maximum $\Delta\lambda_{\frac{1}{2}}$ (FWHM) for the peak at $\lambda_c$ is given by:

$$\Delta\lambda_{\frac{1}{2}} = \lambda_c/2\alpha d \quad (5)$$

As can be seen from Equation (5), the bandwidth is inversely proportional to the product of the dispersion rate $\alpha$ and the plate thickness d. Other maximums in the transmission will also occur at wavelengths where the phase retardation is an integral multiple of $2\pi$. The separation of these peaks near $\lambda_c$ is given approximately by $$\Delta\lambda = \lambda_c/\alpha d \quad (6)$$

This separation $\Delta\lambda$ is defined as the free spectral range.

One embodiment of the present invention takes the form of a Lyot-Ohman filter, as illustrated in an exploded, perspective view in FIG. 3. Four birefringent elements 24, 26, 28, and 30 are spaced along a beam path 14, each with an optic axis (as represented by the lines 32, 34, 36, and 38) perpendicular to the path 14. Furthermore, each element is twice as thick as the preceding element, i.e., in the four element filter shown, elements 24, 26, 28, and 30 are of thicknesses d, 2d, 4d, and 8d, respectively. The elements also exhibit a birefringence which is zero at a particular wavelength $\lambda$.

An initial polarizer 10 precedes the elements 24–30 along the path 14, while a final polarizer 16 follows the elements along the path. The filter is completed by intermediate polarizers 40, 42, and 44, which are placed between each two adjacent elements, with all five polarizers having a common polarization direction, as indicated by the lines 12, 18, 46, 48, and 50, which is perpendicular to the beam path 14 and is rotated about the path by 45° with respect to the optic axes 32–38.

The performance of the Lyot-Ohman embodiment of this invention can be analyzed as follows. Consider a Lyot-Ohman filter whose plate thicknesses are in geometric progression, i.e., d, 2d, 4d . . . $2^{N-1}$d. The transmission T of such a filter for polarized light is given by:

$$T = \prod_{l=1}^{N} \cos^2\left[2^{l-1}\frac{\Gamma}{2}\right] = \left[\frac{\sin 2^N \frac{\Gamma}{2}}{2^N \sin \frac{\Gamma}{2}}\right]^2 \quad (7)$$

where $\Gamma$ is the phase retardation of the thinnest plate as given by Equation (4). In the spectral regimes around $\lambda_c$, the phase retardation of the thinnest plate will be given approximately by:

$$\Gamma = \frac{2\pi}{\lambda} \alpha(\lambda - \lambda_c) d \quad (8)$$

The transmission in these spectral regimes is thus:

$$T = \left\{\frac{\sin[2^N \alpha\pi(\lambda - \lambda_c)d/\lambda]}{2^N \sin[\alpha\pi(\lambda - \lambda_c)d/\lambda]}\right\}^2 \quad (9)$$

from which it may be seen that the transmission spectrum is similar to that of a grating with $2^N$ lines. The bandwidth of the system is governed by that of the band from the thickest plate. The bandwidth $\Delta\lambda_{\frac{1}{2}}$ (FWHM) for the peak at $\lambda_c$ is given by:

$$\Delta\lambda_{\frac{1}{2}} = 0.886 \frac{\lambda_c}{2^N \alpha d} \quad (10)$$

where N is the number of stages and d is the thickness of the thinnest plate. The free spectral range (FSR) of this filter is determined by the thickness of the thinnest plate:

$$FSR = \frac{\lambda_c}{\alpha d} \quad (11)$$

The finesse F of the filter, which is defined as the ratio of the free spectral range to the bandwidth, is:

$$F = 1.13 \times 2^N \quad (12)$$

Figure 4:
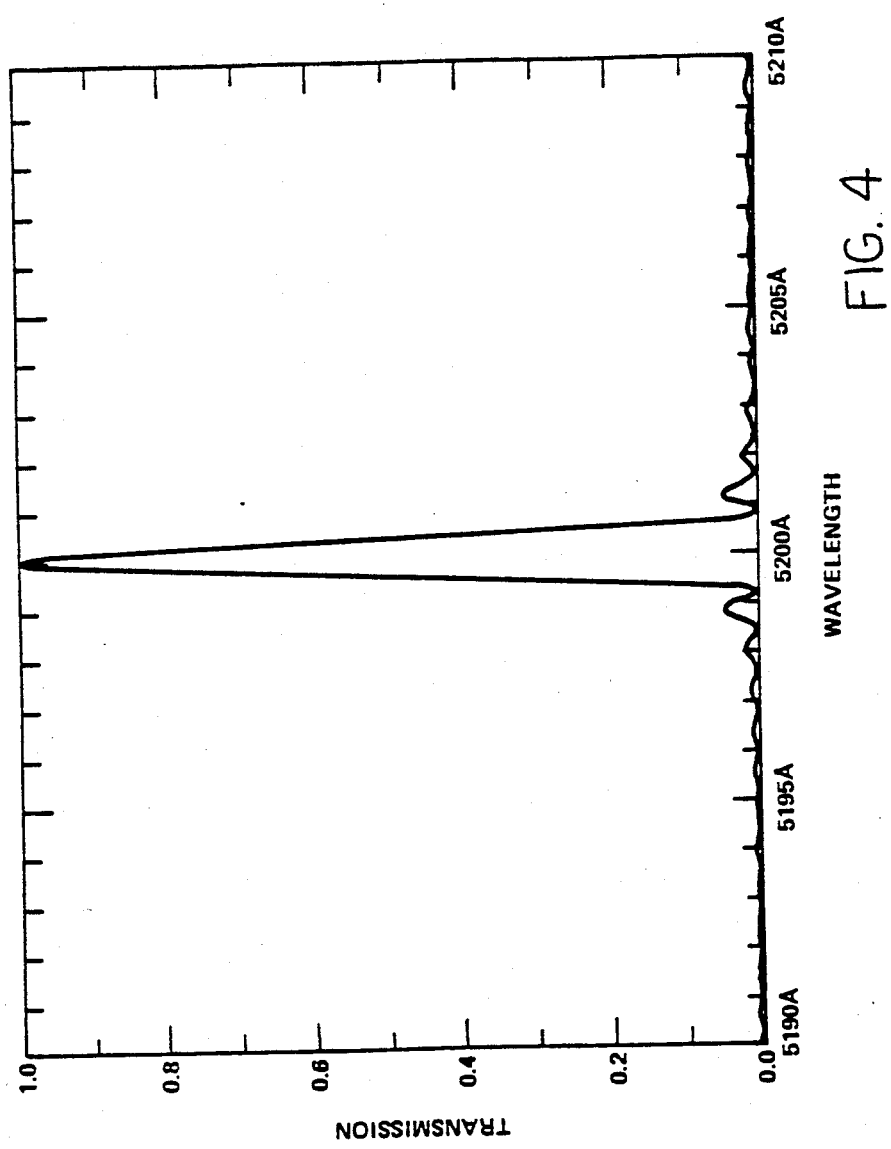
FIG. 4 illustrates a theoretically calculated transmission spectrum for a filter like that shown in FIG. 3.

A theoretically calculated transmission spectrum for such a filter having four plates of CdS with thicknesses of 200, 400, 800, and 1600 $\mu$m is shown in FIG. 4. Calculations have also been made for an iso-index Lyot Filter having four x-cut AgGaS$_2$ plates with thicknesses of 200, 400, 800, and 1600 $\mu$m, yielding a passband at 4970 Å with a bandwidth of 0.8 Å and a free spectral range of 27 Å.

Another embodiment of this invention is configured as a Solc filter, as illustrated in an exploded perspective view in FIG. 5. This filter includes an initial polarizer 52 with its polarization direction perpendicular to the beam path 14, as indicated by the lines 54. A final polarizer 56 is spaced from the initial polarizer along the path 14 and is polarized in the same direction, as indicated by the lines 58. The Solc filter includes a plurality of N birefringent elements arranged along the beam path, each with an optic axis perpendicular to the path such that the optic axis of the nth element (n=1, 2 . . . N) is rotated with respect to the polarization direction by $\rho(2n-1)$ where $\rho=45°/N$. Thus, in the five element embodiment illustrated in FIG. 5, birefringent elements 60, 62, 64, 66, and 68, which are all of equal thickness, are arranged along the beam path 14 so that the optic axis of the element 60, indicated by the line 70, is rotated with respect to the polarization direction (lines 54 and 58) by 9° and the optic axes of the elements 62–68, as represented by the lines 72, 74, 76, and 78, are rotated by 27°, 45°, 63°, and 81°, respectively. As in all the embodiments of this invention, these elements exhibit a birefringence which is zero at a particular passband wavelength $\lambda$.

To analyze the Solc embodiment of the invention, consider a fan type Solc filter which consists of N plates of zero crossing birefringent materials placed between a pair of parallel polarizers. The plate thicknesses are identical, and the azimuth angles of the plates are arranged in the sequence $\rho$, $3\rho$, $5\rho$. . . $(2N-1)\rho$ with $\rho=45°/N$. The transmission T of such a filter structure for polarized light in the spectral regime around $\lambda_c$ is:

$$T = \left[\frac{\sin \frac{\pi}{2} x}{x}\right]^2 \quad (13)$$

with $$x^2 = 1 + \left(\frac{N\Gamma}{\pi}\right)^2 \quad (14)$$

where $\Gamma$ is the phase retardation of each plate. The maximum transmission will occur at the wavelength $\lambda_c$, with a bandwidth $\Delta\lambda_{\frac{1}{2}}$ (FWHM) which is given by:

$$\Delta\lambda_{\frac{1}{2}} = 0.80 \frac{\lambda_c}{N\alpha d} \quad (15)$$

Note that the bandwidth is inversely proportional to the total thickness of the crystal plates (Nd) and is also inversely proportional to $\alpha$. The free spectral range (FSR) of this filter structure is determine by the thickness of the plates and is obtained by finding the wavelength at which the plate becomes a full-wave plate. The result is:

$$FSR = \frac{\lambda_c}{ad} \quad (16)$$

The finesse F of this filter is given by:

$$F = 1.25 \, N \quad (17)$$

Figure 6:
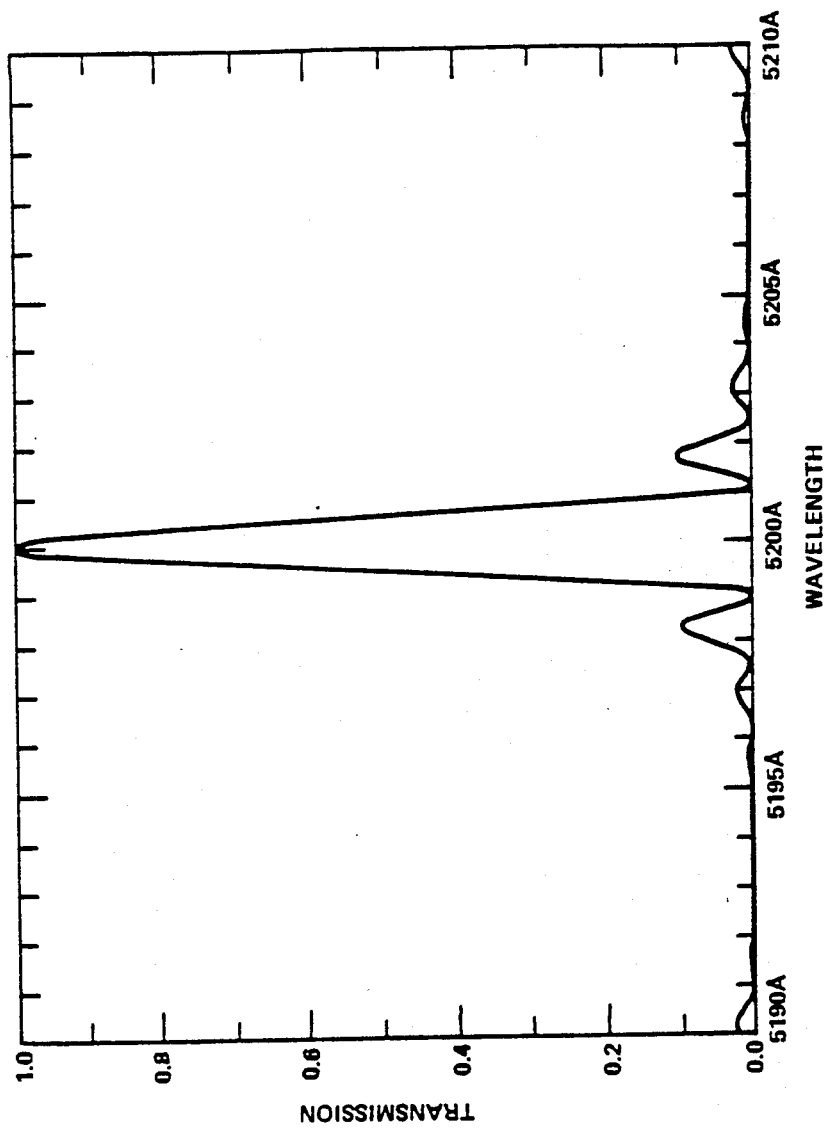
FIG. 6 depicts a theoretically calculated transmission spectrum for a filter like that of FIG. 5.

A theoretically calculated transmission spectrum for a typical zero crossing Solc filter with 10 plates of CdS each 200 μm thick is illustrated in FIG. 6. With 10 x-cut AgGaS$_2$ plates, such a filter will exhibit a passband at 4970 Å, with a calculated bandwidth of approximately 1.1 Å and a free spectral range of 27 Å.

It is clear that the iso-index filter structures of this invention freely transmit light at the wavelength $\lambda_c$, since no phase retardation is introduced by the crystal plates at that wavelength. The light at that wavelength will thus suffer no loss at the polarizers (other than a 50% loss at the initial polarizer). For light at other wavelengths, the plates are birefringent and introduce phase retardations which change the polarization state of the light. This light will therefore undergo some loss at the polarizers. In this fashion light at wavelengths other than $\lambda_c$ will be strongly discriminated and the structures will operate as narrow band filters, with sidelobes in the transmission spectrum which are similar to those of conventional birefringent filters. A major advantage of the filters constructed according to the present invention, however, is that the main peak of the zero crossing birefringent filter occurs at the isotropic point where every plate becomes a zero wave plate, whereas the peak transmission of a conventional birefringent filter occurs at wavelengths where the plates are integral multiples of the full wave plate. It is this difference which affords the filters of the present invention an extraordinarily large field of view in comparison with the filters of the prior art.

The peak transmission, since it is at the isotropic point $\lambda_c$, will be independent of the angle of incidence. The bandwidth $\Delta\lambda_{\frac{1}{2}}$, however, will depend on the angle of incidence. To consider the angular dependence of these transmission characteristics, assume that the optic axis of each plate is parallel to the surfaces of the plates. Let $\theta$ be the angle of incidence in air and $\phi$ be the angle between the plane of incidence and the optic axis of a typical plate. The phase retardation of the plate for light at this direction of incidence $(\theta,\phi)$ is given by:

$$\Gamma = (k_{ez} - k_{oz})d \quad (18)$$

with $$k_{oz} = \frac{2\pi}{\lambda}(n_o^2 - \sin^2\theta)^{\frac{1}{2}} \quad (19)$$

$$k_{ez} = \frac{2\pi}{\lambda}\left(n_e^2 - \sin^2\theta \sin^2\phi - \frac{n_e^2}{n_o^2}\sin^2\theta \cos^2\phi\right)^{\frac{1}{2}} \quad (20)$$

where d is the thickness of the plate and $k_{oz}$, $k_{ez}$ are the normal components of the wave vectors of the ordinary and extraordinary waves, respectively. For light with nonnormal angles of incidence, the phase retardation $\Gamma$ is not given by the simple expression of Equation (4), but is a function of both $\theta$ and $\phi$. If the angle of incidence is such that $\sin^2\theta < < n^2$, the phase retardation can be expressed approximately as:

$$\Gamma = \frac{2\pi}{\lambda}(n_e - n_o)d\left[1 - \frac{\sin^2\theta}{2n_o^2}\left(1 - \frac{n_e + n_o}{n_e}\sin^2\phi\right)\right] \quad (21)$$

In the spectral regime around $\lambda_c$, $n_e - n_o$ is indicated by Equation (1) and $n_e$ is approximately equal to $n_o$, so that the phase retardation $\Gamma$ becomes:

$$\Gamma = \frac{2\pi}{\lambda}\alpha(\lambda - \lambda_c)d\left[1 - \frac{\sin^2\theta}{2n^2}(1 - 2\sin^2\phi)\right] \quad (22)$$

where n is the common value of $n_o$ and $n_e$ at the isotropic point $\lambda_c$. Note that $\Gamma = 0$ at $\lambda = \lambda_c$, regardless of the angle of incidence $(\theta,\phi)$. Therefore, the transmission maximum of the zero crossing birefringent filter at $\lambda_c$ is independent of the angle of incidence. The bandwidth, however, is expected to be different from that for light at normal incidence. In the case of the Lyot-Ohman filter, for example, the bandwidth $\Delta\lambda_{\frac{1}{2}}$ (FWHM) for light incident from the direction $(\theta,\phi)$ is:

$$\Delta\lambda_{\frac{1}{2}}(\theta,\phi) = \frac{\Delta\lambda_{\frac{1}{2}}}{1 - \frac{\sin^2\theta}{2n^2}(1 - 2\sin^2\phi)} \quad (23)$$

where $\Delta\lambda_{\frac{1}{2}}$ is the bandwidth as determined by Equation (10).

Figure 7:
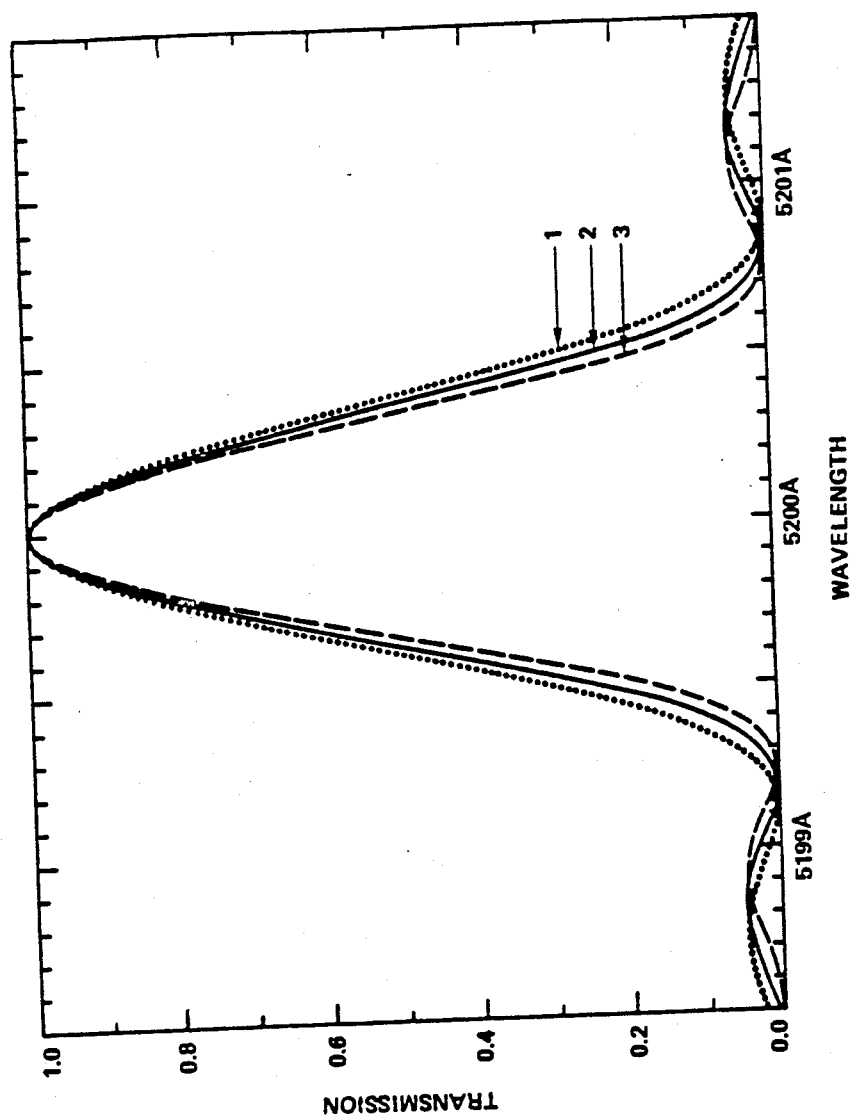
FIG. 7 illustrates the field of view characteristics for the filter represented in FIG. 4.

At an extreme angle of incidence, where $\theta = \pi/2$ and $\phi = 0$ (or $\pi/2$), the bandwidth will be increased or decreased by a factor $\frac{1}{2}n^2$. For the case of CdS with $\lambda_c = 5200$ Å and $n = 2.7$, for example, the bandwidth for light at these extremes will be increased or decreased by 7% relative to normally incident light. The free spectral range (FSR) will also be scaled by the same factor. A theoretically calculated transmission spectrum for the filter described in connection with FIG. 4 is shown in FIG. 7 with field of view characteristics emphasized, curve 1 representing light at normal incidence, curve 2 an angle of incidence $\theta = 90°$ with the plane of incidence perpendicular to the c-axis of the plates ($\phi = 90°$), and curve 3 the same angle of incidence with the plane of incidence parallel to the optic axis of the plates ($\phi = 0°$).

Figure 8:
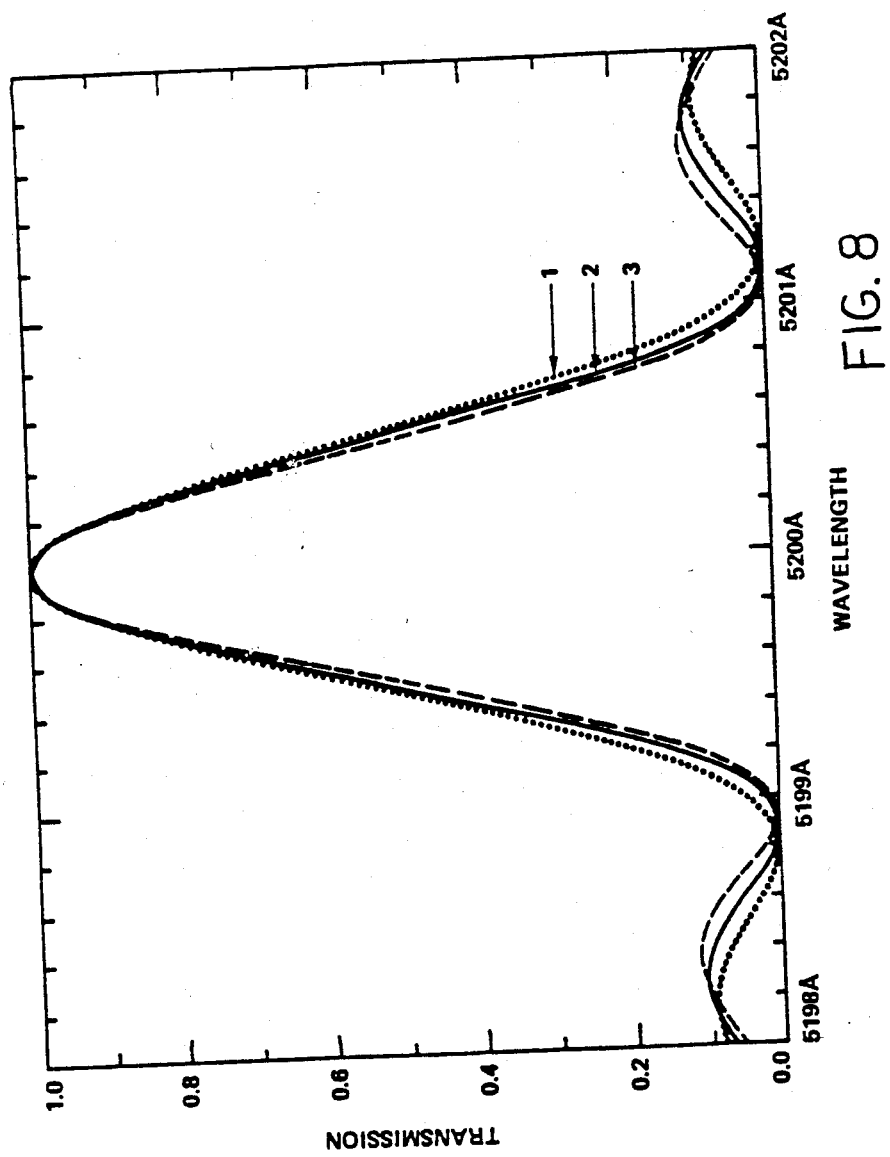
FIG. 8 illustrates the field of view characteristics for the filter characterized in FIG. 6.

In the case of the fan Solc iso-index filter, the optic axis of each plate is oriented at a different angle, so that the phase retardation for off-axis light will be different for each plate. The net result is that the broadening (or narrowing) of the spectral bandwidth is expected to be smaller than that of a comparable Lyot-Ohman filter. FIG. 8 plots the field of view characteristics for the Solc iso-index filter described in connection with FIG. 6. Curve 1 plots the transmission of light at normal incidence, curve 2 for an extreme angle of incidence ($\theta = 90°$) with the plane of incidence perpendicuar to the averaged direction of the optic axes of the plates, and curve 3 represents the extreme angle of incidence ($\theta = 90°$) with the plane of incidence parallel to the averaged direction of the optic axes. The free spectral range of this filter at a nonnormal angle of incidence is also increased or decreased by the same factor. The numerical results shown in FIGS. 7 and 8 indicate that the broadening and narrowing are smaller than those of the Lyot-Ohman filter. No appreciable broadening is apparent in the results for the case where the plane of incidence is parallel or perpendicular to the polarizer axis, which is 45° with respect to the average direction of the optic axes of the plates. This corresponds to $\phi=45°$ or 135° for the case of the Lyot-Ohman filter when the phase retardation is independent of the angle of incidence $\theta$.

Another important feature of the iso-index filter of this invention is its spectral selectivity. Unlike conventional birefringent filters, the present filter has a bandwidth $\Delta\lambda_{\frac{1}{2}}$ which is determined by the product of the total filter thickness and the dispersion rate $\alpha$. Many birefringent materials exhibit a sharp crossing of birefringence with a dispersion rate of approximately $10^{-4}/\text{Å}$ (CdS and AgGaS$_2$, for example, have $\alpha$ of around $2\times10^{-4}/\text{Å}$. Thus, crystals such as CdS or AgGaS$_2$ with a total thickness of 2 mm could be used in the present filter to achieve a bandwidth of 1 Å, according to Equations (5) and (15). To obtain a conventional wide field Lyot 1 type of filter with the same bandwidth would require a thickest plate of about 40 cm, yet the latter filter would have a field of view of only 20°.

In conclusion, this new type of birefringent filter promises to accommodate a very wide field of view while simultaneously maintaining a very narrow passband. The large field of view arises from the operation of the filter at the isotropic point, which is a material property and is independent of the optical path in the crystal. Because of the sharp zero crossing of birefringence exhibited by many materials, very narrow passbands can be easily achieved in a relatively thin filter structure with this new approach. Therefore, the problem of bulk absorptive loss can also be minimized. Thickness nonuniformities and surface roughness in the filter elements will have very little effect on the passband of this filter, because any plate will be a zero wave plate regardless of its thickness, although out of band rejection could be degraded by these variations. Another consideration which should be accounted for in the design of such sub-angstrom filters is any inhomogeneity in the refractive index of the filter elements.

Although some typical embodiments of the present invention have been illustrated and discussed above, modifications and additional embodiments of the invention will undoubtedly be apparent to those skilled in the art. Various changes, for example, might be made in the configurations, sizes, and arrangements of the component parts without departing from the scope of the invention. Furthermore, equivalent elements may be substituted for those illustrated and described herein, parts or connections might be reversed or otherwise interchanged, and certain features of the invention might be utilized independently of other features. Consequently, the examples presented herein, which are provided to teach those skilled in the art how to construct the apparatus of this invention, should be considered as illustrative only and not all inclusive, the appended claims being more indicative of the full scope of the invention.

What is claimed is:

1. An optical Filter for selectively transmitting light in a passband at the wavelength $\lambda$, comprising:
    an initial polarizer with a polarization direction perpendicular to a beam path;
    a final polarizer spaced from said initial polarizer along said path and having said polarization direction; and
    a birefringent element positioned between said polarizers with an optic axis perpendicular to said path and directed approximately 45° from said polarization direction, said element having a birefringence which is zero at the wavelength $\lambda$.

2. The filter of claim 1, wherein said birefringent element further comprises a uniaxial crystal.

3. The filter of claim 2, wherein said uniaxial crystal further comprises CdS.

4. The filter of claim 1, further comprising:
    a plurality of birefringent elements spaced along said beam path between said polarizers, each with an optic axis perpendicular to said path and each being twice as thick as the preceding element, said elements having a birefringence which is zero at the wavelength $\lambda$; and
    an intermediate polarizer between each two adjacent elements,
    each of said polarizers having said polarization direction such that said optic axes are directed approximately 45° from said polarization direction.

5. The filter of claim 1, further comprising a plurality of N birefringent elements arranged along said beam path between said polarizers, each with an optic axis perpendicular to said path such that the optic axis of the nth element ($n=1, 2 \ldots N$) is rotated with respect to said polarization direction by $\rho(2n-1)$ where $\rho=45°/N$, said elements having a birefringence which is zero at the wavelength $\lambda$.

6. The filter of claim 5, wherein said birefringent elements are equal in thickness in the direction of said beam path.

7. An optical filter for selectively transmitting light in a passband at the wavelength $\lambda$, comprising:
    an initial polarizer with a polarization direction perpendicular to a beam path;
    a final polarizer spaced from said initial polarizer along said path and having said polarization direction; and
    a plurality of N birefringent elements of equal thickness arranged along said beam path between said polarizers, each with an optic axis perpendicular to said path such that the optic axis of the nth element ($n=1, 2 \ldots N$) is rotated with respect to said polarization direction by $\rho(2n-1)$ where $\rho=45°/N$, said elements having a birefringence which is zero at the wavelength $\lambda$.

8. An optical filter for selectively transmitting light in a passband at the wavelength $\lambda$, comprising:
    an initial polarizer with a polarization direction perpendicular to a beam path;
    a final polarizer spaced from said initial polarizer along said path and having said polarization direction;
    a plurality of birefringent elements spaced along said path between said polarizers, each element being twice as thick as the preceding element, each element having an optic axis perpendicular to said path and parallel to all said optic axes, and each element having a birefringence which is zero at the wavelength $\lambda$; and
    an intermediate polarizer between each two adjacent elements, each of said intermediate polarizers having said polarization direction,
    said optic axes being directed approximately 45° from said polarization direction.

9. The filter of claim 7 or 8, wherein said birefringent elements further comprise uniaxial crystals.

10. The filter of claim 9, wherein said uniaxial crystals further comprise CdS.

* * * * *